United States Patent
Oishi

(10) Patent No.: US 11,005,093 B2
(45) Date of Patent: May 11, 2021

(54) POSITIVE ELECTRODE ACTIVE MATERIAL FOR NON-AQUEOUS ELECTROLYTE SECONDARY BATTERY COMPRISING A COMPLEX OXIDE

(71) Applicant: NICHIA CORPORATION, Anan (JP)

(72) Inventor: Kengo Oishi, Komatsushima (JP)

(73) Assignee: NICHIA CORPORATION, Anan (JP)

(*) Notice: Subject to any disclaimer, the term of this patent is extended or adjusted under 35 U.S.C. 154(b) by 0 days.

(21) Appl. No.: 16/926,499

(22) Filed: Jul. 10, 2020

(65) Prior Publication Data

US 2020/0343534 A1    Oct. 29, 2020

Related U.S. Application Data

(62) Division of application No. 15/245,860, filed on Aug. 24, 2016, now Pat. No. 10,749,165.

(30) Foreign Application Priority Data

Aug. 25, 2015 (JP) .................................. 2015-165382
Aug. 23, 2016 (JP) .................................. 2016-162545

(51) Int. Cl.

| | | |
|---|---|---|
| H01M 4/131 | (2010.01) | |
| H01M 4/1397 | (2010.01) | |
| H01M 10/0525 | (2010.01) | |
| H01M 4/136 | (2010.01) | |
| H01M 4/58 | (2010.01) | |
| C04B 35/01 | (2006.01) | |
| C04B 35/626 | (2006.01) | |
| C04B 35/64 | (2006.01) | |
| H01M 4/525 | (2010.01) | |
| H01M 4/505 | (2010.01) | |
| H01M 4/02 | (2006.01) | |

(52) U.S. Cl.

CPC .......... *H01M 4/1397* (2013.01); *C04B 35/01* (2013.01); *C04B 35/62625* (2013.01); *C04B 35/64* (2013.01); *H01M 4/136* (2013.01); *H01M 4/505* (2013.01); *H01M 4/525* (2013.01); *H01M 4/5825* (2013.01); *H01M 10/0525* (2013.01); *C04B 2235/3268* (2013.01); *C04B 2235/3275* (2013.01); *C04B 2235/3279* (2013.01); *C04B 2235/44* (2013.01); *C04B 2235/442* (2013.01); *C04B 2235/447* (2013.01); *C04B 2235/448* (2013.01); *C04B 2235/6562* (2013.01); *H01M 2004/021* (2013.01); *H01M 2004/028* (2013.01)

(58) Field of Classification Search
None
See application file for complete search history.

(56) References Cited

U.S. PATENT DOCUMENTS

| | | | |
|---|---|---|---|
| 2006/0134521 A1* | 6/2006 | Shima | H01M 4/525 429/231.1 |
| 2007/0202405 A1 | 8/2007 | Okahara | |
| 2011/0076564 A1* | 3/2011 | Yu | H01M 4/1391 429/231.1 |
| 2015/0287985 A1 | 10/2015 | Miki | |

FOREIGN PATENT DOCUMENTS

| | | |
|---|---|---|
| JP | 2001-076724 A | 3/2001 |
| JP | 2003-146662 A | 5/2003 |
| JP | 2005-276502 A | 10/2005 |
| JP | 2006-134816 A | 5/2006 |
| JP | 2006-172753 A | 6/2006 |
| JP | 2009-064585 A | 3/2009 |
| JP | 2015-201252 A | 11/2015 |

* cited by examiner

*Primary Examiner* — Lucas J. O'Donnell
(74) *Attorney, Agent, or Firm* — Hunton Andrews Kurth LLP

(57) ABSTRACT

A positive electrode active material for a non-aqueous electrolyte secondary battery includes secondary particles of a lithium transition metal complex oxide as a main component. The main component is represented by a formula: $Li_t(Ni_{1-x}Co_x)_{1-y}Mn_yB_\alpha P_\beta S_\gamma O_2$, where t, x, y, $\alpha$, $\beta$, and $\gamma$ satisfy inequalities of $0 \leq x \leq 1$, $0.00 \leq y \leq 0.50$, $(1-x)\cdot(1-y) \geq y$, $0.000 \leq \alpha \leq 0.020$, $0.000 \leq \beta = 0.030$, $0.000 \leq \gamma \leq 0.030$, and $1+3\alpha+3\beta+2\gamma \leq t \leq 1.30$, and satisfy at least one of inequalities of $0.002 \leq \alpha$, $0.006 \leq \beta$, and $0.004 \leq \gamma$. The secondary particles exhibit a pore distribution, where a pore volume Vp(1) having a pore diameter of not less than 0.01 μm and not more than 0.15 μm satisfies an inequality of 0.035 cm³/g≤Vp(1) and where a pore volume Vp(2) having a pore diameter of not less than 0.01 μm and not more than 10 μm satisfies an inequality of Vp(2)≤0.450 cm³/g.

6 Claims, No Drawings

POSITIVE ELECTRODE ACTIVE MATERIAL FOR NON-AQUEOUS ELECTROLYTE SECONDARY BATTERY COMPRISING A COMPLEX OXIDE

CROSS REFERENCE TO RELATED APPLICATIONS

This is a divisional application of U.S. patent application Ser. No. 15/245,860, filed Aug. 24, 2016, which claims the benefit of Japanese Patent Application No. 2015-165382, filed Aug. 25, 2015 and Japanese Patent Application No. 2016-162545, filed Aug. 23, 2016. The entire disclosures of all are incorporated herein.

BACKGROUND

Technical Field

The present disclosure relates to a positive electrode active material for a non-aqueous electrolyte secondary battery such as lithium ion secondary batteries.

Description of Related Art

A non-aqueous electrolyte secondary battery such as lithium ion secondary battery is being widely used as a power source for mobile phone, notebook computer and the like. The non-aqueous electrolyte secondary battery also attracts attention as a battery for a motive power such as electric vehicle in terms of a response to the environmental problem.

A lithium transition metal complex oxide such as lithium cobalt complex oxide is used as the positive electrode active material of the non-aqueous electrolyte secondary battery. Since the lithium transition metal complex oxide is usually used in the form of particles, there are some techniques for controlling the form of the particles. Among such techniques, there is a technique that utilizes a spray-drying.

Patent Literature 1 (JP 2005-276502 A) describes an example where a slurry containing a lithium compound and a transition metal compound is prepared, the resultant slurry is spray-dried to be a precursor, the resultant precursor is mixed with a lithium compound, and the resultant mixture is calcined to obtain a lithium transition metal complex oxide.

Patent Literature 2 (JP 2001-076724 A) describes an example where a slurry containing a transition metal compound and a boron compound or a phosphorus compound is prepared, the resultant slurry is spray-dried, the resultant dried substance is temporarily calcined, then the resultant temporarily calcined material is mixed with a lithium compound, and the resultant mixture is calcined to obtain a lithium transition metal complex oxide.

Patent Literature 3 (JP 2006-172753 A) describes an example where a slurry containing a sulfur compound and a transition metal compound is prepared, the resultant slurry is spray-dried, the resultant dried substance is mixed with a lithium compound, and the resultant mixture is calcined to obtain a lithium transition metal complex oxide.

CITATION LIST

Patent Literature

Patent Literature 1: JP 2005-276502 A
Patent Literature 2: JP 2001-076724 A
Patent Literature 3: JP 2006-172753 A

SUMMARY

A secondary battery used as a power source for electric vehicle and the like requires a characteristics capable of discharging with high current for a long time. Discharging with high current can be achieved by increasing the specific surface area of the lithium transition metal complex oxide particles used for the positive electrode active material. However, a positive electrode for which a lithium transition metal complex oxide particles having high specific surface area are used as the positive electrode active material tends to have decreased volumetric energy density. This means that a time capable of discharging is decreased.

On the other hand, volumetric energy density can be improved by compressing the positive electrode to increase the density of the positive electrode. However, the positive electrode active material tends to be delaminated from the positive electrode when the positive electrode for which the lithium transition metal complex oxide particles having high specific surface area are used is compressed.

When discharging with high current is carried out, the discharge capacity of the secondary battery tends to be decreased. This also has decreased a time during which the secondary battery can be discharged.

The present disclosure is made in view of the above-mentioned circumstances. The purpose of the present disclosure is to provide a positive electrode active material for a non-aqueous electrolyte secondary battery which can achieve a non-aqueous electrolyte secondary battery capable of discharging with high current for a long time.

An embodiment according to the present disclosure is a positive electrode active material for a non-aqueous electrolyte secondary battery including secondary particles of a lithium transition metal complex oxide as a main component represented by a formula: $Li_t(Ni_{1-x}Co_x)_{1-y}Mn_yB_\alpha P_\beta S_\gamma O_2$, wherein t, x, y, α, β, and γ satisfy inequalities of $0 \le x \le 1$, $0.00 \le y \le 0.50$, $(1-x)\cdot(1-y) \ge y$, $0.000 \le \alpha \le 0.020$, $0.000 \le \beta \le 0.030$, $0.000 \le \gamma \le 0.030$, and $1+3\alpha+3\beta+2\gamma \le t \le 1.30$, and satisfy at least one of inequalities of $0.002 \le \alpha$, $0.006 \le \beta$, and $0.004 \le \gamma$. The secondary particles exhibit a pore distribution, where a pore volume Vp(1) having a pore diameter of not less than 0.01 μm and not more than 0.15 μm satisfies an inequality of $0.035 \text{ cm}^3/\text{g} \le Vp(1)$ and where a pore volume Vp(2) having a pore diameter of not less than 0.01 μm and not more than 10 μm satisfies an inequality of $Vp(2) \le 0.450 \text{ cm}^3/\text{g}$. As used herein, the main component means a component accounting for 85% or more by weight of the positive electrode active material.

Another embodiment according to the present disclosure is a method of producing a positive electrode active material for a non-aqueous electrolyte secondary battery including secondary particles of a lithium transition metal complex oxide as a main component represented by a formula: $Li_t(Ni_{1-x}Co_x)_{1-y}Mn_yB_\alpha P_\beta S_\gamma O_2$, wherein t, x, y, α, β, and γ satisfy inequalities of $0 \le x \le 1$, $0.00 < y \le 0.50$, $(1-x)\cdot(1-y) \ge y$, $0.000 \le \alpha \le 0.020$, $0.000 \le \beta \le 0.030$, $0.000 \le \gamma \le 0.030$, and $1+3\alpha+3\beta+2\gamma \le t \le 1.30$, and satisfy at least one of inequalities of $0.002 \le \alpha$, $0.006 \le \beta$, and $0.004 \le \gamma$. The method includes: obtaining a first raw material slurry containing lithium, at least one selected from nickel and cobalt, manganese, and at least one selected from boron, phosphorus, and sulfur; pulverizing the first raw material slurry to obtain a second raw material slurry; spray-drying the second raw material slurry to obtain a dried substance; mixing the dried substance with at least one selected from lithium hydroxide and lithium carbonate to obtain a raw material mixture corresponding to a target composition of the main component; and calcining the raw material mixture to obtain a sintered body. Defining a molar ratio of lithium to the sum of nickel, cobalt, and manganese in the first raw material slurry as Li/Me(1), Li/Me(1) satisfies an inequality of $0.01<\{Li/Me(1)\}-(3\alpha+3\beta+2\gamma)<0.70$.

Yet another embodiment according to the present disclosure is a method of producing a positive electrode active material for a non-aqueous electrolyte secondary battery comprising secondary particles of a lithium transition metal complex oxide as a main component represented by a formula: $Li_tNi_{1-x}Co_xB_\alpha P_\beta S_\gamma O_2$, wherein t, x, $\alpha$, $\beta$, and $\gamma$ satisfy inequalities of $0 \leq x \leq 1$, $0.000 \leq \alpha \leq 0.020$, $0.000 \leq \beta \leq 0.030$, $0.000 \leq \gamma \leq 0.030$, and $1+3\alpha+3\beta+2\gamma \leq t \leq 1.30$, and satisfy at least one of inequalities of $0.002 \leq \alpha$, $0.006 \leq \beta$, and $0.004 \leq \gamma$. The method includes: obtaining a first raw material slurry containing lithium, at least one selected from nickel and cobalt, and at least one selected from boron, phosphorus and sulfur; pulverizing the first raw material slurry to obtain a second raw material slurry; spray-drying the second raw material slurry to obtain a dried substance; mixing the dried substance with at least one selected from lithium hydroxide and lithium carbonate to obtain a raw material mixture corresponding to a target composition of the main component; and calcining the raw material mixture to obtain a sintered body. Defining a molar ratio of lithium to the sum of nickel and cobalt in the first raw material slurry as Li/Me(1), Li/Me(1) satisfies an inequality of $0.01<\{Li/Me(1)\}-(3\alpha+3\beta+2\gamma)<0.70$.

According to the present disclosure, it is possible to obtain a positive electrode active material for a non-aqueous electrolyte secondary battery which can achieve a non-aqueous electrolyte secondary battery capable of discharging with high current for a long time.

DETAILED DESCRIPTION

Hereinafter, a positive electrode active material for a non-aqueous electrolyte secondary battery according to one embodiment of the present disclosure, and a method of producing the same according to another embodiment of the present disclosure will be described. However, the present disclosure is not limited by the following description. Hereinafter, the positive electrode active material for the non-aqueous electrolyte secondary battery is simply referred to as a positive electrode active material.

Composition

A composition of a lithium transition metal complex oxide constituting a main component of the positive electrode active material is represented by a formula: $Li_t(Ni_{1-x}Co_x)_{1-y}Mn_yB_\alpha P_\beta S_\gamma O_2$, wherein t, x, y, $\alpha$, $\beta$, and $\gamma$ satisfy inequalities of $0 \leq x \leq 1$, $0.00 \leq y \leq 0.50$, $(1-x)\cdot(1-y) \geq y$, $0.000 \leq \alpha \leq 0.020$, $0.000 \leq \beta \leq 0.030$, $0.000 \leq \gamma \leq 0.030$, and $1+3\alpha+3\beta+2\gamma \leq t \leq 1.30$, and satisfy at least one of inequalities of $0.002 \leq \alpha$, $0.006 \leq \beta$, and $0.004 \leq \gamma$.

x can be any value satisfying $0 \leq x \leq 1$. However, the range of x is preferably $0 \leq x \leq 0.5$ since both of low cost and high charge and discharge capacity can be achieved simultaneously. More preferable range of x is $0 \leq x \leq 0.3$.

y satisfies $0.00 \leq y \leq 0.50$ since too large value of y is likely to cause the formation of impurity phase. The range of y is preferably $0.05 \leq y \leq 0.40$ since charge and discharge capacity, safety and low cost can be achieved simultaneously. More preferable range of y is $0.10 \leq y \leq 0.30$.

Regarding transition metals constituting the lithium transition metal complex oxide, the relation between x and y satisfies $(1-x)\cdot(1-y) \geq y$ since impurity phase is likely to be formed in the case where the amount of manganese is larger than the amount of nickel. The values of x and y preferably satisfy an inequality of $0.35 \leq (1-x)\cdot(1-y) \leq 0.60$ while satisfying the above-mentioned relation since charge and discharge capacity and low cost can be achieved simultaneously.

The values of $\alpha$, $\beta$, and $\gamma$ satisfy the inequalities of $0.000 \leq \alpha \leq 0.020$, $0.000 \leq \beta \leq 0.030$, and $0.000 \leq \gamma \leq 0.030$, and further satisfy at least one inequality of $0.002 \leq \alpha$, $0.006 \leq \beta$, and $0.004 \leq \gamma$. In the case where $\alpha$, $\beta$, and $\gamma$ do not satisfy these relations, at least one of pore volumes Vp(1) and Vp(2) is out of the predetermined range. A further condition to be satisfied in order to control Vp(1) and Vp(2) within the predetermined ranges will be described hereinafter.

In the case where the value of t is too small, impurity phase is likely to form. In the case where the value of t is too large, impurity phase containing lithium is likely to form. As a result, the positive electrode paste can turn into a gel. Therefore, it is necessary to adjust the value of t appropriately. Lower limit of t is $1+3\alpha+3\beta+2\gamma$ in light of the influence of boron, phosphorus, and sulfur in the lithium transition metal complex oxide. Upper limit of t is 1.30 since only a ratio of transition metals and lithium constituting the lithium transition metal complex oxide is important. Preferable range of t is $1.02 \leq t \leq 1.25$.

Pore Distribution

The main component forms secondary particles. The secondary particles exhibit a pore distribution where Vp(1) and Vp(2) satisfy $0.035$ cm$^3$/g$\leq$Vp(1) and Vp(2)$\leq$0.450 cm$^3$/g. Vp(1) satisfying $0.035$ cm$^3$/g$\leq$Vp(1) suppresses decrease of the discharge capacity when discharging with high current. Vp(2) satisfying Vp(2)$\leq$0.450 cm$^3$/g allows a positive electrode having high electrode plate density to be produced easily.

The pore distribution is evaluated by a log differential pore volume distribution, where a pore diameter is plotted on a horizontal axis as a logarithmic axis and a log differential pore volume is plotted on a vertical axis as a linear axis. A pore volume for a certain range of the pore diameter is a value obtained by integrating the log differential pore volume over the certain range of the pore diameter.

The positive electrode active material for the non-aqueous electrolyte secondary battery exhibiting the above-mentioned pore distribution can be obtained efficiently by another embodiment described below.

A method of producing a positive electrode active material according to another embodiment is a method of producing a positive electrode active material including secondary particles of a lithium transition metal complex oxide as a main component represented by a formula: $Li_t(Ni_{1-x}Co_x)_{1-y}Mn_yB_\alpha P_\beta S_\gamma O_2$, wherein t, x, y, $\alpha$, $\beta$, and $\gamma$ satisfy inequalities of $0 \leq x \leq 1$, $0.00<y \leq 0.50$, $(1-x)\cdot(1-y) \geq y$, $0.000 \leq \alpha \leq 0.020$, $0.000 \leq \beta \leq 0.030$, $0.000 \leq \gamma \leq 0.030$, and $1+3\alpha+3\beta+2\gamma \leq t \leq 1.30$, and satisfy at least one of inequalities of $0.002 \leq \alpha$, $0.006 \leq \beta$, and $0.004 \leq \gamma$. The method includes: obtaining a first raw material slurry containing lithium, at least one selected from nickel and cobalt, manganese, and at least one selected from boron, phosphorus, and sulfur; pulverizing the first raw material slurry to obtain a second raw material slurry; spray-drying the second raw material slurry to obtain a dried substance; mixing the dried substance with at least one selected from lithium hydroxide and lithium carbonate to obtain a raw material mixture corresponding to a target composition of the main component; and calcining the raw material mixture to obtain a sintered body. Each step will be described below.

Obtaining First Raw Material Slurry

The first raw material slurry containing lithium, at least one selected from nickel and cobalt, manganese, and at least one selected from boron, phosphorus, and sulfur is obtained.

In the case where the target composition of the main component includes manganese (in the case of y>0), the first raw material slurry also contains manganese. Defining a molar ratio of lithium to the sum of nickel, cobalt, and manganese contained in the first raw material slurry as Li/Me(1), Li/Me(1) satisfies an inequality of $0.01<\{Li/Me(1)\}-(3\alpha+3\beta+2\gamma)<0.70$. In the case where Li/Me(1) satisfies $\{Li/Me(1)\}-(3\alpha+3\beta+2\gamma)\leq 0.01$, Vp(1) is less than 0.035 cm$^3$/g. In the case where Li/Me(1) satisfies $0.70\leq\{Li/Me(1)\}-(3\alpha+3\beta+2\gamma)$, Vp(2) exceeds 0.450 cm$^3$/g.

As the lithium contained in the first raw material slurry, a lithium having a form which is relatively stable at room temperature and is made into an oxide at higher temperature can be selected. For example, lithium oxide, lithium hydroxide, lithium carbonate, lithium nitrate, lithium acetate, lithium oxalate, and the like can be selected. Hereinafter, the lithium contained in the first raw material slurry is collectively referred to as a Li source (1).

As the nickel contained in the first raw material slurry, a nickel having a form which is relatively stable at room temperature and is made into an oxide at higher temperature can be selected. For example, metal nickel, nickel oxide, nickel hydroxide, nickel nitrate, nickel oxyhydroxide, nickel carbonate, and the like can be selected.

As the cobalt contained in the first raw material slurry, a cobalt having a form which is relatively stable at room temperature and is made into an oxide at higher temperature can be selected. For example, metal cobalt, cobalt oxide, cobalt hydroxide, cobalt nitrate, cobalt oxyhydroxide, cobalt carbonate, and the like can be selected.

As the manganese contained in the first raw material slurry, a manganese having a form which is relatively stable at room temperature and is made into an oxide at higher temperature can be selected. For example, metal manganese, manganese oxide, manganese hydroxide, manganese nitrate, manganese oxyhydroxide, manganese carbonate, and the like can be selected.

The nickel, the cobalt, and the manganese contained in the first raw material slurry may have a form of a complex compound. For example, they can have a form of such as nickel cobalt complex oxide, nickel cobalt manganese complex carbonate, and cobalt manganese complex hydroxide.

As the boron contained in the first raw material slurry, a boron having a form which is relatively stable at room temperature and is made into an oxide at higher temperature can be selected. For example, boron, boron oxide, boric acid, ammonium borate, and the like can be selected. Furthermore, the boron may have a form of a complex compound with the other element of the main component. For example, the boron can have a form of lithium borate, in which case the lithium borate is also the Li source (1).

As the phosphorus contained in the first raw material slurry, a phosphorus having a form which is relatively stable at room temperature and is made into an oxide at higher temperature can be selected. For example, ammonium phosphate, ammonium dihydrogenphosphate, and the like can be selected. Furthermore, the phosphorus may have a form of a complex compound with the other element of the main component. For example, the phosphorus can have a form of such as lithium phosphate, nickel phosphate, and nickel manganese complex phosphate. Lithium phosphate is also the Li source (1). Nickel phosphate is also the nickel source. Nickel manganese complex phosphate is also the nickel source and the manganese source.

As the sulfur contained in the first raw material slurry, a sulfur having a form which is relatively stable at room temperature and is made into an oxide at higher temperature can be selected. For example, ammonium sulfate, sulfur, and the like can be selected. Furthermore, the sulfur may have a form of a complex compound with the other element of the main component. For example, the sulfur can have a form of such as lithium sulfate, lithium sulfide, cobalt sulfate, nickel cobalt manganese complex sulfate, and nickel sulfide. Lithium sulfate and lithium sulfide are also the Li source (1). Cobalt sulfate is also the cobalt source. Nickel cobalt manganese complex sulfate is also the nickel source, the cobalt source and the manganese source. Nickel sulfide is also the nickel source.

Obtaining Second Raw Material Slurry

The resultant first raw material slurry is pulverized to obtain the second raw material slurry. 10% integrated value $D_{10}$ in the volume-based particle size distribution of the second raw material slurry preferably satisfies an inequality of $D_{10}\leq 0.07$ µm since it makes the values of Vp(1) and Vp(2) easy to control within the predetermined ranges. A known method, such as bead mill, ball mill, and pin mill, may be applied appropriately as the pulverizing method.

Obtaining Dried Substance

The resultant second raw material slurry is spray-dried to obtain the dried substance. Conditions, apparatus, and the like for the spray-drying may be selected appropriately from a known technique depending on the purpose. Typically, the target dried substance can be obtained by preparing one or more nozzles for introducing the second raw material slurry and one or more nozzles for airflow, dispersing the second raw material slurry in a drying chamber of a spraying apparatus, and rapidly removing a liquid phase from the second raw material slurry. A flow rate for each nozzle and a flow ratio between each nozzle may be set appropriately depending on, for example, how far the second raw material slurry is dispersed. The temperature in the drying chamber may be set appropriately depending on the content of the raw material slurry, the rate for removing the liquid phase and the like.

Obtaining Raw Material Mixture

The resultant dried substance is mixed with at least one selected from lithium hydroxide and lithium carbonate to obtain the raw material mixture corresponding to the target composition of the main component. Hereinafter, the lithium compound contained in the raw material mixture is collectively referred to as a Li source (2), and a molar ratio of the lithium compound contained in the raw material mixture to the complex oxide in the resultant dried substance is defined as Li/Me(2).

Obtaining Sintered Body

The resultant raw material mixture is calcined to obtain the sintered body. In the case where the calcination temperature in this step is too high, sintering inside the secondary particles proceeds, and Vp(1) tends to be decreased. In the case where the calcination temperature in this step is too low, sintering of the whole of the secondary particles does not sufficiently proceed, and Vp(2) tends to be increased. The calcination temperature is preferably not less than 650° C. and not more than 940° C. since the predetermined Vp(1) and Vp(2) are readily achieved. More preferable range of the calcination temperature is not less than 700° C. and not more than 900° C.

The higher the rate of temperature increase to the calcination temperature in this step is, the easier Vp(2) is to be decreased. Preferable range of the rate of temperature increase is 3.0° C./min or more.

After-Treatment

After-treatment such as cracking, pulverizing, classification, and dry-sieving of the resultant sintered body may be carried out appropriately depending on the purpose.

A method of producing a positive electrode active material according to yet another embodiment is different from the above-mentioned method in that the value of y is zero (y=0). The method according to the yet another embodiment is a method of producing a positive electrode active material for a non-aqueous electrolyte secondary battery including secondary particles of a lithium transition metal complex oxide as a main component represented by a formula: $Li_tNi_{1-x}Co_xB_\alpha P_\beta S_\gamma O_2$, wherein t, x, $\alpha$, $\beta$, and $\gamma$ satisfy inequalities of $0 \leq x \leq 1$, $0.000 \leq \alpha \leq 0.020$, $0.000 \leq \beta \leq 0.030$, $0.000 \leq \gamma \leq 0.030$, and $1+3\alpha+3\beta+2\gamma \leq t \leq 1.30$, and satisfy at least one of inequalities of $0.002 \leq \alpha$, $0.006 \leq \beta$, and $0.004 \leq \gamma$. The method includes: obtaining a first raw material slurry containing lithium, at least one selected from nickel and cobalt, and at least one selected from boron, phosphorus, and sulfur; pulverizing the first raw material slurry to obtain a second raw material slurry; spray-drying the second raw material slurry to obtain a dried substance; mixing the dried substance with at least one selected from lithium hydroxide and lithium carbonate to obtain a raw material mixture corresponding to a target composition of the main component; and calcining the raw material mixture to obtain a sintered body. Each step can be carried out in the same manner as described above except that the first raw material slurry does not contain manganese. When the value of y satisfies y=0, that is, when the first raw material slurry does not contain manganese, a molar ratio of lithium to the sum of nickel and cobalt in the first raw material slurry is defined as Li/Me(1).

Example 1

A complex oxide represented by a composition formula $(Ni_{0.48}Co_{0.26}Mn_{0.26})_2O_3$ was obtained by a coprecipitation method. The resultant complex oxide and 0.065 mol of lithium carbonate, 0.010 mol of orthoboric acid, 0.019 mol of lithium phosphate, and 0.001 mol of lithium sulfate relative to 0.5 mol of the resultant complex oxide were dispersed in purified water to obtain a first raw material slurry having a solid content concentration of 20%. The values of Li/Me(1), $\alpha$, $\beta$, and $\gamma$ for the first raw material slurry satisfy Li/Me(1)=0.19 and $\{Li/Me(1)\}-(3\alpha+3\beta+2\gamma)=0.10$.

The resultant first raw material slurry was pulverized by a ball mill to obtain a second raw material slurry having $D_{10}$ which satisfied $D_{10}=0.03$ μm.

The resultant second raw material slurry with a flow rate of 18 mL/min and an air with a flow rate of 20 L/min were introduced into a three-fluid spray nozzle, and spray-drying was carried out at a drying temperature of 240° C. to obtain a dried substance.

The resultant dried substance was mixed with 0.506 mol of lithium carbonate relative to 0.5 mol of the complex oxide in the resultant dried substance to obtain a raw material mixture.

The temperature of the resultant raw material mixture was elevated to 800° C. at a rate of temperature increase of 3.3° C./min, and the raw material mixture was calcined at a calcination temperature of 800° C. for five hours to obtain a sintered body represented by a composition formula $Li_{1.20}Ni_{0.48}Co_{0.26}Mn_{0.26}B_{0.010}P_{0.019}S_{0.001}O_2$.

The resultant sintered body was passed through a dry sieving with 200 mesh to obtain a target positive electrode active material.

Example 2

Preparation was carried out similarly to that in Example 1 except that the calcination temperature was 840° C. to obtain a target positive electrode active material.

Example 3

A complex oxide represented by a composition formula $(Ni_{0.48}Co_{0.26}Mn_{0.26})_2O_3$ was obtained by a coprecipitation method. The resultant complex oxide and 0.056 mol of lithium carbonate, 0.004 mol of orthoboric acid, and 0.001 mol of lithium sulfate relative to 0.5 mol of the resultant complex oxide were dispersed in purified water to obtain a first raw material slurry having a solid content concentration of 20%. The values of Li/Me(1), $\alpha$, $\beta$, and $\gamma$ for the first raw material slurry satisfy Li/Me(1)=0.11 and $\{Li/Me(1)\}-(3\alpha+3\beta+2\gamma)=0.10$.

The resultant first raw material slurry was pulverized by the ball mill to obtain a second raw material slurry having $D_{10}$ which satisfied $D_{10}=0.03$ μm.

The resultant second raw material slurry with a flow rate of 18 mL/min and an air with a flow rate of 20 L/min were introduced into the three-fluid spray nozzle, and spray-drying was carried out at a drying temperature of 240° C. to obtain a dried substance.

The resultant dried substance was mixed with 0.543 mol of lithium carbonate relative to 0.5 mol of the complex oxide in the resultant dried substance to obtain a raw material mixture.

The temperature of the resultant raw material mixture was elevated to 850° C. at a rate of temperature increase of 3.3° C./min, and the raw material mixture was calcined at a calcination temperature of 850° C. for five hours to obtain a sintered body represented by a composition formula $Li_{1.20}Ni_{0.48}Co_{0.26}Mn_{0.26}B_{0.004}S_{0.001}O_2$.

The resultant sintered body was passed through the dry sieving with 200 mesh to obtain a target positive electrode active material.

Example 4

A complex oxide represented by a composition formula $(Ni_{0.48}Co_{0.26}Mn_{0.26})_2O_3$ was obtained by a coprecipitation method. The resultant complex oxide and 0.050 mol of lithium carbonate, 0.010 mol of lithium phosphate, and 0.001 mol of lithium sulfate relative to 0.5 mol of the resultant complex oxide were dispersed in purified water to obtain a first raw material slurry having a solid content concentration of 20%. The values of Li/Me(1), $\alpha$, $\beta$, and $\gamma$ for the first raw material slurry satisfy Li/Me(1)=0.13 and $\{Li/Me(1)\}-(3\alpha+3\beta+2\gamma)=0.10$.

The resultant first raw material slurry was pulverized by the ball mill to obtain a second raw material slurry having $D_{10}$ which satisfied $D_{10}=0.03$ μm.

The resultant second raw material slurry with a flow rate of 18 mL/min and an air with a flow rate of 20 L/min were introduced into the three-fluid spray nozzle, and spray-drying was carried out at a drying temperature of 240° C. to obtain a dried substance.

The resultant dried substance was mixed with 0.534 mol of lithium carbonate relative to 0.5 mol of the complex oxide in the resultant dried substance to obtain a raw material mixture.

The temperature of the resultant raw material mixture was elevated to 840° C. at a rate of temperature increase of 3.3° C./min, and the raw material mixture was calcined at a calcination temperature of 840° C. for five hours to obtain a sintered body represented by a composition formula $Li_{1.20}Ni_{0.48}Co_{0.26}Mn_{0.26}P_{0.010}S_{0.001}O_2$.

The resultant sintered body was passed through the dry sieving with 200 mesh to obtain a target positive electrode active material.

Example 5

A complex oxide represented by a composition formula $(Ni_{0.48}Co_{0.26}Mn_{0.26})_2O_3$ was obtained by a coprecipitation method. The resultant complex oxide and 0.156 mol of lithium carbonate, 0.004 mol of orthoboric acid, 0.019 mol of lithium phosphate, and 0.001 mol of lithium sulfate relative to 0.5 mol of the resultant complex oxide were dispersed in purified water to obtain a first raw material slurry having a solid content concentration of 20%. The values of Li/Me(1), $\alpha$, $\beta$, and $\gamma$ for the first raw material slurry satisfy Li/Me(1)=0.37 and $\{Li/Me(1)\}-(3\alpha+3\beta+2\gamma)=0.30$.

The resultant first raw material slurry was pulverized by the ball mill to obtain a second raw material slurry having $D_{10}$ which satisfied $D_{10}$=0.03 μm.

The resultant second raw material slurry with a flow rate of 18 mL/min and an air with a flow rate of 20 L/min were introduced into the three-fluid spray nozzle, and spray-drying was carried out at a drying temperature of 240° C. to obtain a dried substance.

The resultant dried substance was mixed with 0.415 mol of lithium carbonate relative to 0.5 mol of the complex oxide in the resultant dried substance to obtain a raw material mixture.

The temperature of the resultant raw material mixture was elevated to 800° C. at a rate of temperature increase of 3.3° C./min, and the raw material mixture was calcined at a calcination temperature of 800° C. for five hours to obtain a sintered body represented by a composition formula $Li_{1.20}Ni_{0.48}Co_{0.26}Mn_{0.26}B_{0.004}P_{0.019}S_{0.001}O_2$.

The resultant sintered body was passed through the dry sieving with 200 mesh to obtain a target positive electrode active material.

Example 6

A complex oxide represented by a composition formula $(Ni_{0.48}Co_{0.26}Mn_{0.26})_2O_3$ was obtained by a coprecipitation method. The resultant complex oxide and 0.050 mol of lithium carbonate and 0.010 mol of lithium sulfate relative to 0.5 mol of the resultant complex oxide were dispersed in purified water to obtain a first raw material slurry having a solid content concentration of 20%. The values of Li/Me(1), $\alpha$, $\beta$, and $\gamma$ for the first raw material slurry satisfy Li/Me(1)=0.12 and $\{Li/Me(1)\}-(3\alpha+3\beta+2\gamma)=0.10$.

The resultant first raw material slurry was pulverized by the ball mill to obtain a second raw material slurry having $D_{10}$ which satisfied $D_{10}$=0.03 μm.

The resultant second raw material slurry with a flow rate of 18 mL/min and an air with a flow rate of 20 L/min were introduced into the three-fluid spray nozzle, and spray-drying was carried out at a drying temperature of 240° C. to obtain a dried substance.

The resultant dried substance was mixed with 0.540 mol of lithium carbonate relative to 0.5 mol of the complex oxide in the resultant dried substance to obtain a raw material mixture.

The temperature of the resultant raw material mixture was elevated to 800° C. at a rate of temperature increase of 3.3° C./min, and the raw material mixture was calcined at a calcination temperature of 800° C. for five hours to obtain a sintered body represented by a composition formula $Li_{1.20}Ni_{0.48}Co_{0.26}Mn_{0.26}S_{0.010}O_2$.

The resultant sintered body was passed through the dry sieving with 200 mesh to obtain a target positive electrode active material.

Example 7

A complex oxide represented by a composition formula $(Ni_{0.48}Co_{0.26}Mn_{0.26})_2O_3$ was obtained by a coprecipitation method. The resultant complex oxide and 0.050 mol of lithium carbonate and 0.006 mol of orthoboric acid relative to 0.5 mol of the resultant complex oxide were dispersed in purified water to obtain a first raw material slurry having a solid content concentration of 20%. The values of Li/Me(1), $\alpha$, $\beta$, and $\gamma$ for the first raw material slurry satisfy Li/Me(1)=0.12 and $\{Li/Me(1)\}-(3\alpha+3\beta+2\gamma)=0.10$.

The resultant first raw material slurry was pulverized by the ball mill to obtain a second raw material slurry having $D_{10}$ which satisfied $D_{10}$=0.03 μm.

The resultant second raw material slurry with a flow rate of 18 mL/min and an air with a flow rate of 20 L/min were introduced into the three-fluid spray nozzle, and spray-drying was carried out at a drying temperature of 240° C. to obtain a dried substance.

The resultant dried substance was mixed with 0.541 mol of lithium carbonate relative to 0.5 mol of the complex oxide in the resultant dried substance to obtain a raw material mixture.

The temperature of the resultant raw material mixture was elevated to 835° C. at a rate of temperature increase of 3.3° C./min, and the raw material mixture was calcined at a calcination temperature of 835° C. for five hours to obtain a sintered body represented by a composition formula $Li_{1.20}Ni_{0.48}Co_{0.26}Mn_{0.26}B_{0.006}O_2$.

The resultant sintered body was passed through the dry sieving with 200 mesh to obtain a target positive electrode active material.

Example 8

A complex oxide represented by a composition formula $(Ni_{0.48}Co_{0.26}Mn_{0.26})_2O_3$ was obtained by a coprecipitation method. The resultant complex oxide and 0.050 mol of lithium carbonate and 0.026 mol of lithium phosphate relative to 0.5 mol of the resultant complex oxide were dispersed in purified water to obtain a first raw material slurry having a solid content concentration of 20%. The values of Li/Me(1), $\alpha$, $\beta$, and $\gamma$ for the first raw material slurry satisfy Li/Me(1)=0.18 and $\{Li/Me(1)\}-(3\alpha+3\beta+2\gamma)=0.10$.

The resultant first raw material slurry was pulverized by the ball mill to obtain a second raw material slurry having $D_{10}$ which satisfied $D_{10}$=0.03 μm.

The resultant second raw material slurry with a flow rate of 18 mL/min and an air with a flow rate of 20 L/min were introduced into the three-fluid spray nozzle, and spray-drying was carried out at a drying temperature of 240° C. to obtain a dried substance.

The resultant dried substance was mixed with 0.511 mol of lithium carbonate relative to 0.5 mol of the complex oxide in the resultant dried substance to obtain a raw material mixture.

The temperature of the resultant raw material mixture was elevated to 860° C. at a rate of temperature increase of 3.3° C./min, and the raw material mixture was calcined at a calcination temperature of 860° C. for five hours to obtain a sintered body represented by a composition formula $Li_{1.20}Ni_{0.48}Co_{0.26}Mn_{0.26}B_{0.026}O_2$.

The resultant sintered body was passed through the dry sieving with 200 mesh to obtain a target positive electrode active material.

Comparative Example 1

A complex oxide represented by a composition formula $(Ni_{0.48}Co_{0.26}Mn_{0.26})_2O_3$ was obtained by a coprecipitation method. The resultant complex oxide and 0.365 mol of lithium carbonate, 0.010 mol of orthoboric acid, 0.019 mol of lithium phosphate, and 0.010 mol of lithium sulfate relative to 0.5 mol of the resultant complex oxide were dispersed in purified water to obtain a first raw material slurry having a solid content concentration of 20%. The values of Li/Me(1), α, β, and γ for the first raw material slurry satisfy Li/Me(1)=0.81 and {Li/Me(1)}−(3α+3β+2γ)=0.70.

The resultant first raw material slurry was pulverized by the ball mill to obtain a second raw material slurry having $D_{10}$ which satisfied $D_{10}$=0.03 μm.

The resultant second raw material slurry with a flow rate of 18 mL/min and an air with a flow rate of 20 L/min were introduced into the three-fluid spray nozzle, and spray-drying was carried out at a drying temperature of 240° C. to obtain a dried substance.

The resultant dried substance was mixed with 0.197 mol of lithium carbonate relative to 0.5 mol of the complex oxide in the resultant dried substance to obtain a raw material mixture.

The temperature of the resultant raw material mixture was elevated to 850° C. at a rate of temperature increase of 3.3° C./min, and the raw material mixture was calcined at a calcination temperature of 850° C. for five hours to obtain a sintered body represented by a composition formula $Li_{1.20}Ni_{0.48}Co_{0.26}Mn_{0.26}B_{0.010}P_{0.019}S_{0.010}O_2$.

The resultant sintered body was passed through the dry sieving with 200 mesh to obtain a target positive electrode active material.

Comparative Example 2

A complex oxide represented by a composition formula $(Ni_{0.48}Co_{0.26}Mn_{0.26})_2O_3$ was obtained by a coprecipitation method. The resultant complex oxide and 0.020 mol of lithium carbonate, 0.010 mol of orthoboric acid, 0.019 mol of lithium phosphate, and 0.01 mol of lithium sulfate relative to 0.5 mol of the resultant complex oxide were dispersed in purified water to obtain a first raw material slurry having a solid content concentration of 20%. The values of Li/Me(1), α, β, and γ for the first raw material slurry satisfy Li/Me(1)=0.12 and {Li/Me(1)}−(3α+3β+2γ)=0.01.

The resultant first raw material slurry was pulverized by the ball mill to obtain a second raw material slurry having $D_{10}$ which satisfied $D_{10}$=0.03 μm.

The resultant second raw material slurry with a flow rate of 18 mL/min and an air with a flow rate of 20 L/min were introduced into the three-fluid spray nozzle, and spray-drying was carried out at a drying temperature of 240° C. to obtain a dried substance.

The resultant dried substance was mixed with 0.542 mol of lithium carbonate relative to 0.5 mol of the complex oxide in the resultant dried substance to obtain a raw material mixture.

The temperature of the resultant raw material mixture was elevated to 840° C. at a rate of temperature increase of 3.3° C./min, and the raw material mixture was calcined at a calcination temperature of 840° C. for five hours to obtain a sintered body represented by a composition formula $Li_{1.20}Ni_{0.48}Co_{0.26}Mn_{0.26}B_{0.010}P_{0.019}S_{0.010}O_2$.

The resultant sintered body was passed through the dry sieving with 200 mesh to obtain a target positive electrode active material.

Comparative Example 3

A complex oxide represented by a composition formula $(Ni_{0.48}Co_{0.26}Mn_{0.26})_2O_3$ was obtained by a coprecipitation method. The resultant complex oxide and 0.052 mol of lithium carbonate, 0.001 mol of orthoboric acid, and 0.001 mol of lithium sulfate relative to 0.5 mol of the resultant complex oxide were dispersed in purified water to obtain a first raw material slurry having a solid content concentration of 20%. The values of Li/Me(1), α, β, and γ for the first raw material slurry satisfy Li/Me(1)=0.11 and {Li/Me(1)}−(3α+3β+2γ)=0.10.

The resultant first raw material slurry was pulverized by the ball mill to obtain a second raw material slurry having $D_{10}$ which satisfied $D_{10}$=0.03 μm.

The resultant second raw material slurry with a flow rate of 18 mL/min and an air with a flow rate of 20 L/min were introduced into the three-fluid spray nozzle, and spray-drying was carried out at a drying temperature of 240° C. to obtain a dried substance.

The resultant dried substance was mixed with 0.548 mol of lithium carbonate relative to 0.5 mol of the complex oxide in the resultant dried substance to obtain a raw material mixture.

The temperature of the resultant raw material mixture was elevated to 880° C. at a rate of temperature increase of 3.3° C./min, and the raw material mixture was calcined at a calcination temperature of 880° C. for five hours to obtain a sintered body represented by a composition formula $Li_{1.20}Ni_{0.48}Co_{0.26}Mn_{0.26}B_{0.001}S_{0.001}O_2$.

The resultant sintered body was passed through the dry sieving with 200 mesh to obtain a target positive electrode active material.

Comparative Example 4

A complex oxide represented by a composition formula $(Ni_{0.48}Co_{0.26}Mn_{0.26})_2O_3$ was obtained by a coprecipitation method. The resultant complex oxide and 0.050 mol of lithium carbonate, 0.004 mol of lithium phosphate, and 0.001 mol of lithium sulfate relative to 0.5 mol of the resultant complex oxide were dispersed in purified water to obtain a first raw material slurry having a solid content concentration of 20%. The values of Li/Me(1), α, β, and γ for the first raw material slurry satisfy Li/Me(1)=0.11 and {Li/Me(1)}−(3α+3β+2γ)=0.10.

The resultant first raw material slurry was pulverized by the ball mill to obtain a second raw material slurry having $D_{10}$ which satisfied $D_{10}$=0.03 μm.

The resultant second raw material slurry with a flow rate of 18 mL/min and an air with a flow rate of 20 L/min were introduced into the three-fluid spray nozzle, and spray-drying was carried out at a drying temperature of 240° C. to obtain a dried substance.

The resultant dried substance was mixed with 0.543 mol of lithium carbonate relative to 0.5 mol of the complex oxide in the resultant dried substance to obtain a raw material mixture.

The temperature of the resultant raw material mixture was elevated to 890° C. at a rate of temperature increase of 3.3° C./min, and the raw material mixture was calcined at a calcination temperature of 890° C. for five hours to obtain a sintered body represented by a composition formula $Li_{1.20}Ni_{0.48}Co_{0.26}Mn_{0.26}P_{0.004}S_{0.001}O_2$.

The resultant sintered body was passed through the dry sieving with 200 mesh to obtain a target positive electrode active material.

Evaluation of Pore Distribution

Log differential pore volume distributions were measured for the positive electrode active materials of Examples 1 to 8 and Comparative Examples 1 to 4 by mercury intrusion method. Vp(1) was calculated from the integrated value in the range of the pore diameter of not less than 0.01 μm and not more than 0.15 μm, and Vp(2) was calculated from the integrated value in the range of the pore diameter of not less than 0.01 μm and not more than 10 μm by use of the measured Log differential pore volume distribution.

Evaluation of Delamination in Electrode Plate

Positive electrode plates were prepared in a manner described below by use of the positive electrode active materials of Examples 1 to 8 and Comparative Examples 1 to 4, and evaluation of the delamination in the electrode plates were carried out.

Preparation of Positive Electrode 90 parts by mass of the positive electrode active material, 5 parts by mass of carbon powder, and 5 parts by mass of polyvinylidene fluoride were dispersed and dissolved in N-methylpyrrolidone, and then kneaded to obtain a positive electrode paste. The resultant positive electrode paste was applied to an aluminum foil such that application density was about 8 mg/cm³, and dried. After drying, the applied aluminum foil was rolled with a predetermined pressure and cut off into a predetermined size to obtain a positive electrode plate.

Verification of Presence or Absence of Delamination

A mending tape was stuck to the resultant positive electrode plate and adhered tightly thereto to remove any air. Subsequently, the tape was peeled off with constant force to verify whether the positive electrode active material was delaminated from the positive electrode plate.

Evaluation of Load Efficiency

Batteries for evaluation were prepared in a manner described below by use of the positive electrodes for which no delamination occurred in the electrode plate, and evaluation of the load efficiency for the batteries was carried out.

Preparation of Negative Electrode 97.5 parts by mass of artificial graphite, 1.5 parts by mass of carboxymethyl cellulose, and 1.0 parts by mass of styrene-butadiene rubber were dispersed in water to obtain a negative electrode paste. Predetermined amount of the resultant negative electrode paste was applied to a copper foil and dried. After drying, the applied copper foil was rolled with a predetermined pressure and cut off into a predetermined size to obtain a negative electrode plate.

Preparation of Non-Aqueous Electrolyte

Ethylene carbonate and methyl ethyl carbonate were mixed at a volume ratio of 3:7 to obtain a mixed solvent. Lithium hexafluorophosphate was dissolved into the resultant mixed solvent such that its concentration was 1 mol/L to obtain a non-aqueous electrolyte.

Assembling of Battery for Evaluation

Leading electrodes were respectively fixed to the aluminum foil of the positive electrode plate and the copper foil of the negative electrode plate, and were then vacuum-dried at 120° C. After vacuum-drying, a separator made of porous polyethylene was arranged between the positive electrode plate and the negative electrode plate, put in a bag-shaped laminated pack, and, after that, vacuum-dried at 60° C. After vacuum-drying, the non-aqueous electrolyte was poured into the laminated pack, and the laminated pack was sealed to obtain a non-aqueous electrolyte secondary battery for evaluation.

Measurement of Charge and Discharge Capacity

Constant-current/constant-voltage charging was carried out at charging voltage of 4.3 V and charging current density of 0.25 A/cm². After charging, constant-current discharging was carried out at discharge voltage of 2.75 V and discharge current density of 0.25 A/cm² to determine a discharge capacity at 0.25 A/cm².

Then, constant-current/constant-voltage charging and constant-current discharging were carried out in a similar manner except that the discharge current density was 6.25 A/cm² to determine discharge capacity at a discharge current density of 6.25 A/cm².

The discharge capacity at the discharge current density of 6.25 A/cm² was divided by the discharge capacity at the discharge current density of 0.25 A/cm² to determine a load efficiency. High load efficiency means good load characteristics.

Conditions for preparation of Examples 1 to 8 and Comparative Examples 1 to 4 are shown in Tables 1 and 2, and various characteristics thereof are shown in Table 3.

TABLE 1

|  | Li source (1) | Raw material (other than Li source) | Li/Me (1) | α | β | γ | {Li/Me(1)} − (3a + 3b + 2c) | $D_{10}$ |
|---|---|---|---|---|---|---|---|---|
| Example 1 | $Li_2CO_3$ $Li_3PO_4$ $Li_2SO_4$ | $(Ni_{0.48}Co_{0.26}Mn_{0.26})_2O_3H_3BO_3$ | 0.19 | 0.010 | 0.019 | 0.001 | 0.10 | 0.03 μM |
| Example 2 | $Li_2CO_3$ $Li_3PO_4$ $Li_2SO_4$ | $(Ni_{0.48}Co_{0.26}Mn_{0.26})_2O_3H_3BO_3$ | 0.19 | 0.010 | 0.019 | 0.001 | 0.10 | 0.03 μM |
| Example 3 | $Li_2CO_3$ $Li_2SO_4$ | $(Ni_{0.48}Co_{0.26}Mn_{0.26})_2O_3H_3BO_3$ | 0.11 | 0.004 | 0.000 | 0.001 | 0.10 | 0.03 μM |
| Example 4 | $Li_2CO_3$ $Li_3PO_4$ $Li_2SO_4$ | $(Ni_{0.48}Co_{0.26}Mn_{0.26})_2O_3$ | 0.13 | 0.000 | 0.010 | 0.001 | 0.10 | 0.03 μM |

TABLE 1-continued

|  | Li source (1) | Raw material (other than Li source) | Li/Me (1) | α | β | γ | {Li/Me(1)} − (3a + 3b + 2c) | $D_{10}$ |
|---|---|---|---|---|---|---|---|---|
| Example 5 | $Li_2CO_3$ $Li_3PO_4$ $Li_2SO_4$ | $(Ni_{0.48}Co_{0.26}Mn_{0.26})_2O_3H_3BO_3$ | 0.37 | 0.004 | 0.019 | 0.001 | 0.30 | 0.03 μM |
| Example 6 | $Li_2CO_3$ $Li_2SO_4$ | $(Ni_{0.48}Co_{0.26}Mn_{0.26})_2O_3$ | 0.12 | 0.000 | 0.000 | 0.010 | 0.10 | 0.03 μM |
| Example 7 | $Li_2CO_3$ | $(Ni_{0.48}Co_{0.26}Mn_{0.26})_2O_3H_3BO_3$ | 0.12 | 0.006 | 0.000 | 0.000 | 0.10 | 0.03 μM |
| Example 8 | $Li_2CO_3$ $Li_3PO_4$ | $(Ni_{0.48}Co_{0.26}Mn_{0.26})_2O_3$ | 0.18 | 0.000 | 0.026 | 0.000 | 0.10 | 0.03 μM |
| Comparative Example 1 | $Li_2CO_3$ $Li_3PO_4$ $Li_2SO_4$ | $(Ni_{0.48}Co_{0.26}Mn_{0.26})_2O_3H_3BO_3$ | 0.81 | 0.010 | 0.019 | 0.010 | 0.70 | 0.03 μM |
| Comparative Example 2 | $Li_2CO_3$ $Li_3PO_4$ $Li_2SO_4$ | $(Ni_{0.48}Co_{0.26}Mn_{0.26})_2O_3H_3BO_3$ | 0.12 | 0.010 | 0.019 | 0.010 | 0.01 | 0.03 μM |
| Comparative Example 3 | $Li_2CO_3$ $Li_2SO_4$ | $(Ni_{0.48}Co_{0.26}Mn_{0.26})_2O_3H_3BO_3$ | 0.11 | 0.001 | 0.000 | 0.001 | 0.10 | 0.03 μM |
| Comparative Example 4 | $Li_2CO_3$ $Li_3PO_4$ $Li_2SO_4$ | $(Ni_{0.48}Co_{0.26}Mn_{0.26})_2O_3$ | 0.11 | 0.000 | 0.004 | 0.001 | 0.10 | 0.03 μM |

TABLE 2

|  | Li source (2) | Li/Me(2) | Calcination temperature | Temperature increase rate | Composition of main component |
|---|---|---|---|---|---|
| Example 1 | $Li_2CO_3$ | 1.01 | 800° C. | 3.33° C./min | $Li_{1.20}Ni_{0.480}Co_{0.260}Mn_{0.260}B_{0.010}P_{0.019}S_{0.001}O_2$ |
| Example 2 | $Li_2CO_3$ | 1.01 | 840° C. | 3.33° C./min | $Li_{1.20}Ni_{0.480}Co_{0.260}Mn_{0.260}B_{0.010}P_{0.019}S_{0.001}O_2$ |
| Example 3 | $Li_2CO_3$ | 1.09 | 850° C. | 3.33° C./min | $Li_{1.20}Ni_{0.480}Co_{0.260}Mn_{0.260}B_{0.004}S_{0.001}O_2$ |
| Example 4 | $Li_2CO_3$ | 1.07 | 840° C. | 3.33° C./min | $Li_{1.20}Ni_{0.480}Co_{0.260}Mn_{0.260}P_{0.010}S_{0.001}O_2$ |
| Example 5 | $Li_2CO_3$ | 0.83 | 800° C. | 3.33° C./min | $Li_{1.20}Ni_{0.480}Co_{0.260}Mn_{0.260}B_{0.004}P_{0.019}S_{0.001}O_2$ |
| Example 6 | $Li_2CO_3$ | 1.08 | 800° C. | 3.33° C./min | $Li_{1.20}Ni_{0.480}Co_{0.260}Mn_{0.260}S_{0.010}O_2$ |
| Example 7 | $Li_2CO_3$ | 1.08 | 835° C. | 3.33° C./min | $Li_{1.20}Ni_{0.480}Co_{0.260}Mn_{0.260}B_{0.006}O_2$ |
| Example 8 | $Li_2CO_3$ | 1.02 | 860° C. | 3.33° C./min | $Li_{1.20}Ni_{0.480}Co_{0.260}Mn_{0.260}P_{0.026}O_2$ |
| Comparative Example 1 | $Li_2CO_3$ | 0.39 | 850° C. | 3.33° C./min | $Li_{1.20}Ni_{0.480}Co_{0.260}Mn_{0.260}B_{0.010}P_{0.019}S_{0.010}O_2$ |
| Comparative Example 2 | $Li_2CO_3$ | 1.08 | 840° C. | 3.33° C./min | $Li_{1.20}Ni_{0.480}Co_{0.260}Mn_{0.260}B_{0.010}P_{0.019}S_{0.010}O_2$ |
| Comparative Example 3 | $Li_2CO_3$ | 1.10 | 880° C. | 3.33° C./min | $Li_{1.20}Ni_{0.480}Co_{0.260}Mn_{0.260}B_{0.001}S_{0.001}O_2$ |
| Comparative Example 4 | $Li_2CO_3$ | 1.09 | 890° C. | 3.33° C./min | $Li_{1.20}Ni_{0.480}Co_{0.260}Mn_{0.260}B_{0.004}S_{0.001}O_2$ |

TABLE 3

|  | Vp(1)/ $cm^3g^{-1}$ | Vp(2)/ $cm^3g^{-1}$ | Delamination in electrode plate | Discharge capacity @0.25 A/cm² | Discharge capacity @6.25 A/cm² | Load efficiency/ % |
|---|---|---|---|---|---|---|
| Example 1 | 0.112 | 0.350 | absent | 173 | 147 | 85 |
| Example 2 | 0.061 | 0.332 | absent | 173 | 146 | 85 |
| Example 3 | 0.055 | 0.327 | absent | 172 | 145 | 84 |
| Example 4 | 0.082 | 0.362 | absent | 172 | 151 | 88 |
| Example 5 | 0.110 | 0.374 | absent | 175 | 149 | 85 |
| Example 6 | 0.042 | 0.313 | absent | 172 | 141 | 82 |
| Example 7 | 0.072 | 0.421 | absent | 172 | 156 | 91 |
| Example 8 | 0.053 | 0.409 | absent | 177 | 143 | 81 |
| Comparative Example 1 | 0.044 | 0.520 | present | — | — | — |

TABLE 3-continued

| | Vp(1)/ cm³g⁻¹ | Vp(2)/ cm³g⁻¹ | Delamination in electrode plate | Discharge capacity @0.25 A/cm² | Discharge capacity @6.25 A/cm² | Load efficiency/ % |
|---|---|---|---|---|---|---|
| Comparative Example 2 | 0.025 | 0.248 | absent | 161 | 124 | 77 |
| Comparative Example 3 | 0.020 | 0.564 | present | — | — | — |
| Comparative Example 4 | 0.010 | 0.458 | present | — | — | — |

The following matters can be seen from Tables 1 to 3.

Regarding the positive electrode plates for which the positive electrode active materials of Comparative Examples 1, 3, and 4 were used, the delamination in the electrode plate occurs since Vp(2) exceeds 0.450 cm³/g. That is, it is not possible to obtain a positive electrode plate having high electrode plate density by use of the positive electrode active materials of Comparative Examples 1, 3, and 4.

Regarding the positive electrode plate for which the positive electrode active material of Comparative Example 2 was used, no delamination in the electrode plate occurs. However, the non-aqueous electrolyte secondary battery for which the positive electrode active material of Comparative Example 2 was used has lower load efficiency relative to the non-aqueous electrolyte secondary batteries for which the positive electrode active materials of Examples 1 to 8 were used since Vp(1) is less than 0.035 cm³/g for Comparative Example 2.

From the comparison of Examples 1 to 8 and Comparative Examples 1 to 4, it can be seen that it is necessary to control the relation between lithium and at least one selected from a group consisting of boron, phosphorus, and sulfur in the first raw material slurry within the predetermined range in order to control Vp(1) and Vp(2) within the predetermined range.

INDUSTRIAL APPLICABILITY

The non-aqueous electrolyte secondary battery exhibiting both high volumetric energy density and high load efficiency can be obtained by use of the positive electrode active material according to the present disclosure. The non-aqueous electrolyte secondary battery thus obtained can be used suitably as a power source for equipment such as electric vehicle which requires discharging with high current for a long time.

What is claimed is:

1. A positive electrode active material for a non-aqueous electrolyte secondary battery comprising secondary particles of a lithium transition metal complex oxide as a main component represented by a formula: $Li_t(Ni_{1-x}Co_x)_{1-y}Mn_yB_\alpha P_\beta S_\gamma O_2$, wherein t, x, y, $\alpha$, $\beta$, and $\gamma$ satisfy inequalities of $0 \leq x \leq 1$, $0.00 \leq y \leq 0.50$, $(1-x)\cdot(1-y) \geq y$, $0.000 < \alpha \leq 0.020$, $0.000 < \beta \leq 0.030$, $0.000 < \gamma \leq 0.030$, and $1+3\alpha+3\beta+2\gamma \leq t \leq 1.30$, and satisfy at least one of inequalities of $0.002 \leq \alpha$, $0.006 \leq \beta$, and $0.004 \leq \gamma$, wherein the secondary particles exhibit a pore distribution, where a pore volume Vp(1) having a pore diameter of not less than 0.01 μm and not more than 0.15 μm satisfies an inequality of 0.035 cm³/g≤Vp(1) and where a pore volume Vp(2) having a pore diameter of not less than 0.01 μm and not more than 10 μm satisfies an inequality of Vp(2)≤0.450 cm³/g.

2. The positive electrode active material for the non-aqueous electrolyte secondary battery according to claim 1, wherein x and y satisfy an inequality of $0.35 \leq (1-x)\cdot(1-y) \leq 0.60$.

3. The positive electrode active material for the non-aqueous electrolyte secondary battery according to claim 1, wherein $\alpha$ satisfies an inequality of $0.002 \leq \alpha \leq 0.020$.

4. The positive electrode active material for the non-aqueous electrolyte secondary battery according to claim 3, wherein $\beta$ satisfies an inequality of $0.006 \leq \beta \leq 0.030$.

5. The positive electrode active material for the non-aqueous electrolyte secondary battery according to claim 1, wherein $\beta$ satisfies an inequality of $0.006 \leq \beta \leq 0.030$.

6. The positive electrode active material for the non-aqueous electrolyte secondary battery according to claim 1, wherein 0.053 cm₃/g≤Vp(1).

* * * * *